United States Patent
Peng et al.

(10) Patent No.: US 11,905,694 B2
(45) Date of Patent: Feb. 20, 2024

(54) CENTRALIZED TREATMENT DEVICES FOR KITCHEN WASTE

(71) Applicant: CHANGZHOU UNIVERSITY, Jiangsu (CN)

(72) Inventors: Mingguo Peng, Changzhou (CN); Jianfeng Ma, Changzhou (CN); Yang Qu, Changzhou (CN); Linqiang Mao, Changzhou (CN); Erdeng Du, Changzhou (CN); Fang Zhu, Changzhou (CN); Weibing Zhu, Changzhou (CN); Dongxiao Shi, Changzhou (CN); Yanqiu Zhang, Changzhou (CN); Lu Zheng, Changzhou (CN); Qiuya Zhang, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/456,484

(22) Filed: Aug. 26, 2023

(65) Prior Publication Data
US 2023/0399831 A1 Dec. 14, 2023

Related U.S. Application Data

(63) Continuation-in-part of application No. PCT/CN2022/094044, filed on May 20, 2022.

(30) Foreign Application Priority Data
Mar. 14, 2022 (CN) .......................... 202210246876.9

(51) Int. Cl.
*E03C 1/00* (2006.01)
*E03C 1/266* (2006.01)
(Continued)

(52) U.S. Cl.
CPC ........ *E03C 1/2665* (2013.01); *B02C 18/0084* (2013.01); *B02C 18/0092* (2013.01);
(Continued)

(58) Field of Classification Search
CPC ............... E03C 1/2665; B02C 18/0092; B02C 18/0084; B09B 3/35
See application file for complete search history.

(56) References Cited

U.S. PATENT DOCUMENTS 5,773,281 A * 6/1998 Ichikawa .............. E03C 1/2665
241/DIG. 38
5,971,303 A * 10/1999 Pugh-Gottlieb ........ E03B 1/044
241/101.2
2017/0044748 A1 2/2017 Kang

FOREIGN PATENT DOCUMENTS

CN 102746034 A * 10/2012 ............. Y02A 40/20
CN 102863084 A 1/2013
(Continued)

OTHER PUBLICATIONS

International Search Report in PCT/CN2022/094044 dated Nov. 28, 2022, 8 pages.
(Continued)

*Primary Examiner* — Faye Francis
(74) *Attorney, Agent, or Firm* — METIS IP LLC

(57) ABSTRACT

The embodiments of the present disclosure provide a centralized treatment device for kitchen waste. The centralized treatment device includes an upper box, an outer cover, a pulverizer, an inner cover, a filter press, a drying granulator, a lower box, an electrolysis device, a hanging basket, a material box, an exhaust fan, and a linkage mechanism. Smashed kitchen waste is subjected to solid-liquid separation by the filter press. Filter residues enter the drying granulator to be partially carbonized, and partially carbonized filter residues and mixed powder treatment agent form (Continued)

solid residue particles. The solid residue particles degrade and adsorb pollutants in the water after being activated by an acidic solution. Meanwhile, accumulated water-absorbing solid residue particles help to degrade the pollutants in the water through the electrolysis device. A separation area is configured to separate oil and discharge the oil separately.

10 Claims, 3 Drawing Sheets

(51) Int. Cl.
 *B09B 3/35* (2022.01)
 *B09B 3/32* (2022.01)
 *B02C 18/00* (2006.01)
 *B09B 101/70* (2022.01)
(52) U.S. Cl.
 CPC ............ *B09B 3/32* (2022.01); *B09B 3/35* (2022.01); *B09B 2101/70* (2022.01)

(56) References Cited

FOREIGN PATENT DOCUMENTS

| | | | | | |
|---|---|---|---|---|---|
| CN | 102080104 | B | * | 5/2013 | ............. Y02A 40/20 |
| CN | 103265338 | A | * | 8/2013 | ............. Y02A 40/20 |
| CN | 107744869 | A | * | 3/2018 | ......... B02C 18/0092 |
| CN | 107745004 | A | | 3/2018 | |
| CN | 110723846 | A | | 1/2020 | |
| CN | 113042503 | A | | 6/2021 | |
| CN | 113319107 | A | | 8/2021 | |
| JP | 2000119084 | A | | 4/2000 | |
| KR | 102059773 | B1 | | 2/2020 | |

OTHER PUBLICATIONS

Written Opinion in PCT/CN2022/094044 dated Nov. 28, 2022, 7 pages.

* cited by examiner

CENTRALIZED TREATMENT DEVICES FOR KITCHEN WASTE

CROSS-REFERENCE TO RELATED APPLICATIONS

This application is a continuation-in-part of International Patent Application No. PCT/CN2022/094044, filed on May 20, 2022, which claims priority to the Chinese Patent Application No. 202210246876.9, filed on Mar. 14, 2022, the entire contents of each of which are hereby incorporated by reference.

TECHNICAL FIELD

The present disclosure relates to the field of waste treatment technology, and in particular, to centralized treatment devices for kitchen waste.

BACKGROUND

Kitchen waste, a mixture of leftovers, expired food, and waste from kitchen food processing produced by residents, is a kind of perishable organic waste formed by residents in the process of domestic consumption, and a major pollution source of municipal household waste. With the development of the social economy and the improvement of people's living standards, kitchen waste has increased dramatically, which directly damages the environment and pose a hazard to people's health. At the same time, people pay more and more attention to the environment and health, and many families use their own kitchen waste processors to deal with kitchen waste. However, this kind of kitchen waste processor simply smashes the waste, lacking harmless and resourceful treatment for waste.

Therefore, it is desirable to provide a centralized treatment device for kitchen waste to achieve timely and harmless treatment for kitchen waste.

SUMMARY

One or more embodiments of the present disclosure provide a centralized treatment device for kitchen waste. The centralized treatment device may include an upper box with a horizontal sieve plate fixed inside. The upper box may be provided with a smashing area and a gas treatment area located above the horizontal sieve plate, and a waste pretreatment area and a gas circulation area located below the horizontal sieve plate. The gas circulation area may be connected with the gas treatment area through sieve holes of the horizontal sieve plate, and the gas treatment area may be filled with activated carbon. The centralized treatment device may also include an outer cover hinged to a top end of the upper box and configured to cover upper openings of the smashing area and the gas treatment area. The outer cover may also be configured to open the upper openings of the smashing area and the gas treatment area when the outer cover is turned upward. The centralized treatment device may also include a pulverizer located in the smashing area and configured to smash organic waste. An inlet of the pulverizer may face upward, and an outlet of the pulverizer may be connected with a top end of an upper loading channel of the waste pretreatment area through the sieve holes of the horizontal sieve plate. The centralized treatment device may also include an inner cover hinged in the smashing area and located above the pulverizer and configured to bear or dump the organic waste. The centralized treatment device may also include a filter press mounted in the waste pretreatment area. An inlet of the filter press may be connected with a bottom end of the upper loading channel, a liquid outlet of the filter press may be connected with a downcomer, a filtrate outlet of the filter press may be connected with the downcomer, and a filter residue outlet of the filter press may be connected with a top opening of a lower loading channel. The centralized treatment device may also include a drying granulator mounted in the waste pretreatment area. An inlet of the drying granulator may be connected with a bottom end of the lower loading channel, and an outlet of the drying granulator may be connected with a bottom end of the waste pretreatment area. The centralized treatment device may also include a lower box internally provided with a reservoir area located on a left side for accommodating an acidic solution and a degradation area located on a right side. A separation area located on a left side of the degradation area may be arranged below the reservoir area. An upper end of the reservoir area and a bottom end of the gas circulation area may be both connected with an upper end of the degradation area, and a lower end of the degradation area may be connected with a lower end of the reservoir area. The downcomer may extend to a bottom end of the separation area and may be connected with the bottom end of the separation area. A bottom end of the upper box may be fixedly connected with a top end of the lower box. The centralized treatment device may also include an electrolysis device provided in the degradation area and configured to decompose organic matter in water. The centralized treatment device may also include a hanging basket hinged in the reservoir area and configured to receive solid residue particles falling from a bottom of the waste pre-treatment area. A plurality of through holes are provided between an inner wall and an outer wall of the hanging basket. The centralized treatment device may further include a material box fixedly mounted in the waste pretreatment area and configured to store a powder treatment agent. A fan blade configured to allow the power treatment agent to flow out from a discharge outlet of the material box may be hinged in the material box, and the discharge outlet of the material box may be located directly above the top opening of the lower loading channel. The centralized treatment device may further include an exhaust fan. One end of is the exhaust fan may be connected with a top end of the gas treatment area, and an other end of the exhaust fan may be connected with the outside. The centralized treatment device may further include a linkage mechanism including a first transmission rope, a second transmission rope, and a transmission rod. Two ends of the first transmission rope may be fixedly connected with the outer cover and the hanging basket respectively, two ends of the second transmission rope may be fixedly connected with the outer cover and the inner cover respectively, and two ends of the transmission rod may be hinged to the outer cover and the fan blade respectively. When the outer cover blocks the upper opening of the smashing area, the hanging basket, the inner cover and the fan blade may all be inclined downwards from right to left.

In some embodiments, a long partition may be fixed inside the upper box, and the long partition may divide an interior of the upper box into a transmission area located on a left side and a treatment area located on a right side. The first transmission rope may pass through the transmission area. The horizontal sieve plate may be located in the treatment area, and a space of the treatment area located above a horizontal partition may be divided into the smashing area located on the left side and the gas treatment area located on the right side by a first short partition. A space of the treatment area located below the horizontal partition may be divided into the waste pretreatment area located on the left side and the gas circulation area located on the right side by a second short partition.

In some embodiments, the first short partition may be located in a middle part of the horizontal sieve plate, and the second short partition may be located at a right end of the horizontal sieve plate, thereby allowing for an increase in a space of the waste pretreatment area.

In some embodiments, guide wheels may be rotatably provided on upper and lower ends of a left side surface of the long partition, and a guide wheel may also be rotatably provided on a left side surface of the first short partition. The first transmission rope may be wound sequentially around the guide wheels on the upper and lower ends of the left side surface of the long partition, a bottom end of the first transmission rope may be fixedly connected with a left end of the hanging basket, and a right end of the hanging basket may be hinged to the reservoir area. The second transmission rope may be wound around the guide wheel on the left side surface of the first short partition, a left end of the second transmission rope may be fixedly connected with a left end of the inner cover, and a right end of the inner cover may be hinged to the first short partition. The first transmission rope and the second transmission rope may move according to preset paths, thereby improving the reliability of transmission.

In some embodiments, a feed tube may be provided in the gas treatment area. A bottom end of the feed tube may be connected with the material box. The fan blade and the discharge outlet may be located at two ends of the material box. The discharge outlet may be located at a bottom end of the material box, and a baffle plate may be provided on a side of the discharge outlet close to the fan blade. A height of the baffle plate may be lower than a height of the inner wall of the material box. The powder treatment agent may be added into the material box from the feed tube. An airflow may be formed when the fan blade turns up and down, thereby blowing the powder treatment agent in the material box over a top end of the baffle plate and out of the discharge outlet.

In some embodiments, the electrolysis device may include a first electrolysis electrode plate, a soft rope filler, and a second electrolysis electrode plate. The first electrolysis electrode plate and the second electrolysis electrode plate may be both disposed in the degradation area, and the soft rope filler may be disposed between the first electrolysis electrode plate and the second electrolysis electrode plate. Under an action of the first electrolysis electrode plate and the second electrolysis electrode plate, organic matters in the water may be decomposed, and after the soft rope filler has been filmed for a period of time, a formed biofilm may degrade pollutants in the water. When the solid residue particles in the degradation area increasingly accumulate and fill between the first electrolysis electrode plate and the second electrolysis electrode plate, the solid residue particles between the two electrodes may form a three-dimensional electrode for electrolysis due to the carbon in the solid residue particles.

In some embodiments, a downwardly extending vertical plate may be fixed at a top end of the degradation area, a horizontal plate may be fixed on a right side surface of the vertical plate, and a plurality of filter holes may be disposed in both the vertical plate and the horizontal plate. A filtration area may be formed between a right side surface of the vertical plate, an upper surface of the horizontal plate, and an inner wall of the box. A water drain outlet may be provided at a bottom end of the filtration area, and a water drain valve may be provided at the water drain outlet. Top ends of the first electrolysis electrode plate, the soft rope filler and the second electrolysis electrode plate may be fixed to a lower surface of the horizontal plate.

In some embodiments, a vertical partition, a horizontal partition and an inclined partition may be fixed in the lower box. A bottom end of the vertical partition, a right end of the horizontal partition, and a top end of the inclined partition may be fixedly connected with each other. The reservoir area may be formed between a left side surface of the vertical partition, an upper surface of the horizontal partition, and an inner wall of the lower box. The degradation area may be formed between a right side surface of the vertical partition, a right side surface of the inclined partition, and the inner wall of the lower box. The separation area may be formed between a lower surface of the horizontal partition, a left side surface of the inclined partition, and the inner wall of the lower box. A first gap may be provided between a top end of the vertical partition and a top end of the lower box, and the top end of the reservoir area may be connected with a top end of the degradation area through the first gap. The inclined partition may be inclined downwards from left to right. A second gap may be provided between a bottom end of the inclined partition and a bottom end of the land, and the bottom end of the separation area may be connected with the bottom end of the degradation area through the second gap.

In some embodiments, a liquid drain outlet may be provided at the bottom end of the reservoir area. A liquid drain valve may be provided at the liquid drain outlet. An oil drain tube may be connected at a top end of the separation area. An oil drain valve may be mounted at a top end of the oil drain tube. Heights of the oil drain valve and the water drain valve may be the same.

In some embodiments, the centralized treatment device for kitchen waste may further include a driving device configured to drive the outer cover to open or close.

BRIEF DESCRIPTION OF THE DRAWINGS

The present disclosure may be further illustrated by way of exemplary embodiments, which may be described in detail by means of the accompanying drawings. These embodiments are not limiting, and in these embodiments, the same numbering denotes the same structure, wherein.

DETAILED DESCRIPTION

Figure 1:
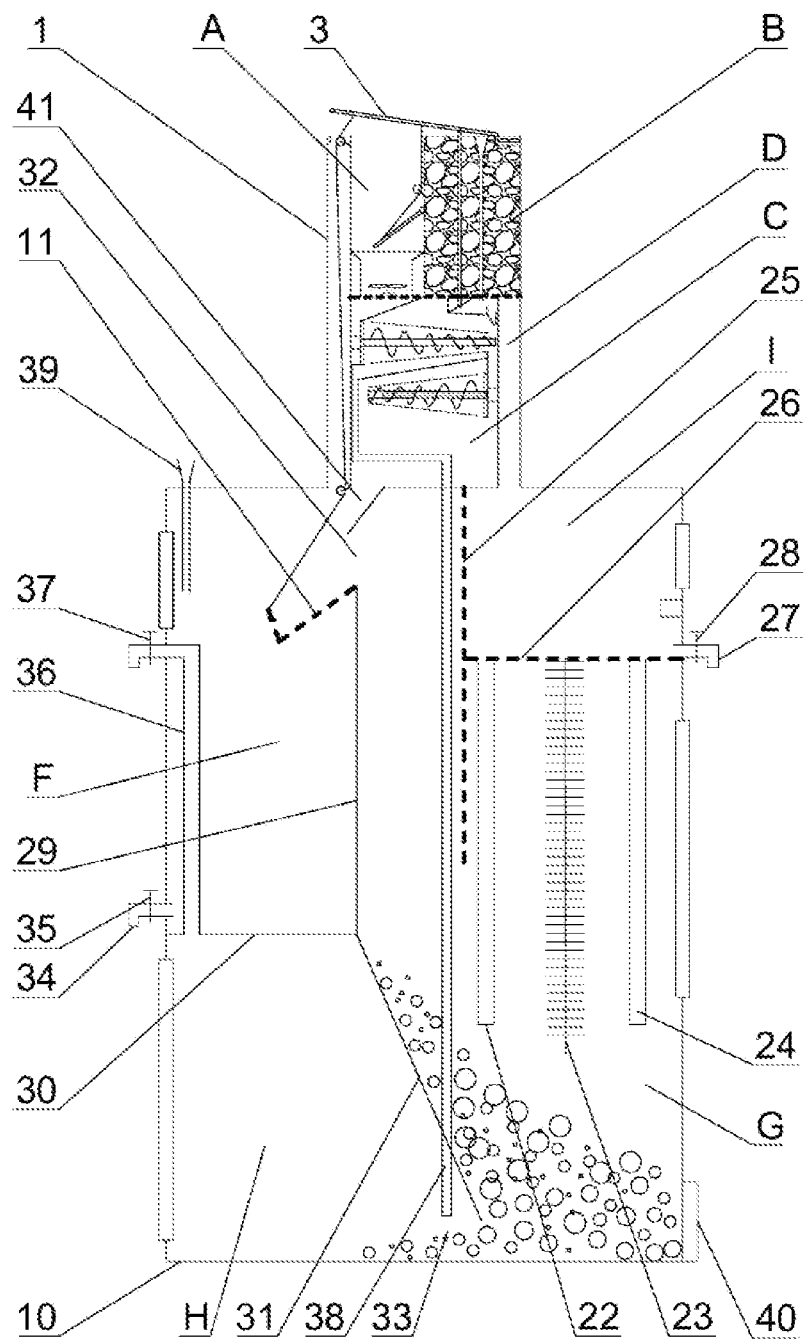
FIG. 1 is a schematic diagram illustrating an exemplary structure of a centralized treatment device for kitchen waste according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

Figure 2:
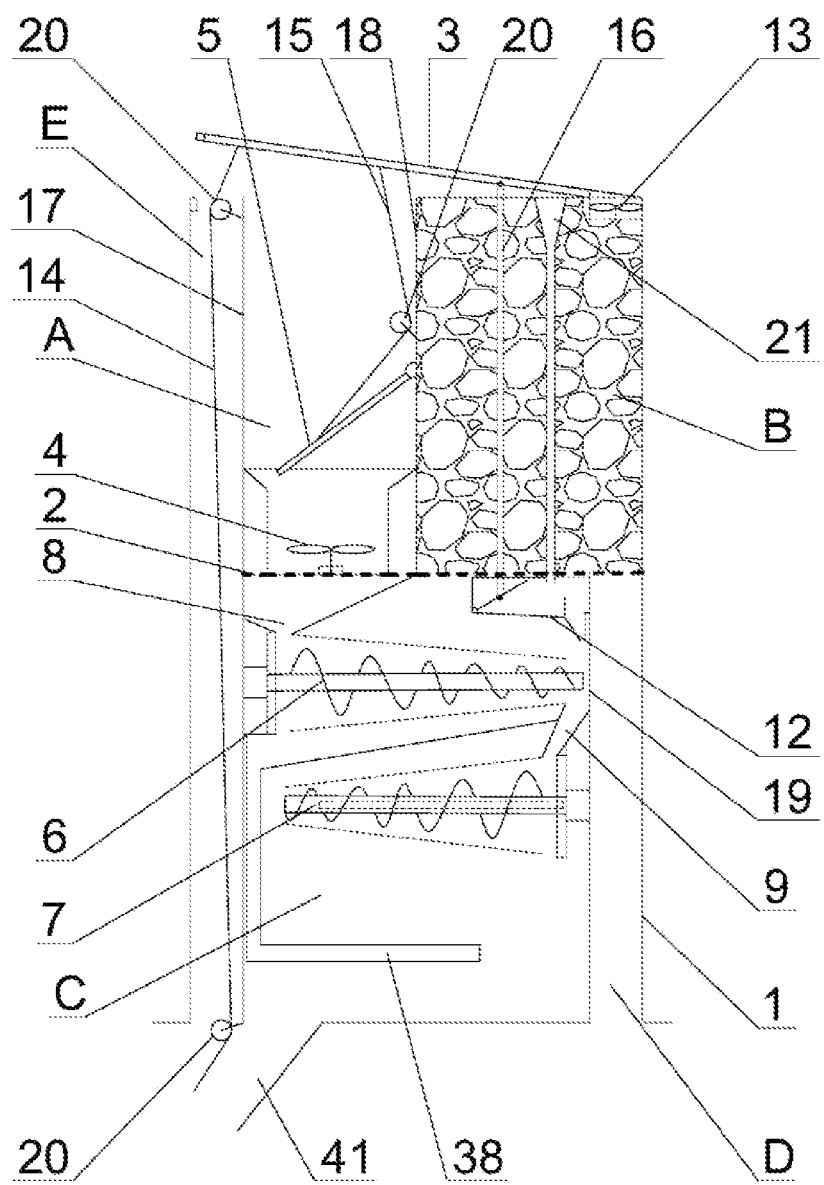
FIG. 2 is a schematic diagram illustrating an exemplary structure of an upper box and an interior thereof of a centralized treatment device for kitchen waste according to some embodiments of the present disclosure.

FIG. 1 is a schematic diagram illustrating an exemplary structure of a centralized treatment device for kitchen waste according to some embodiments of the present disclosure. FIG. 2 is a schematic diagram illustrating an exemplary structure of an upper box and an interior thereof of a centralized treatment device for kitchen waste according to some embodiments of the present disclosure. The following embodiments may be understood with reference to FIGS. 1-2. However, the accompanying drawings are only illustrative of some of these embodiments and do not constitute a limitation of the embodiments.

In some embodiments, as shown in FIGS. 1-2, the centralized treatment device for kitchen waste may include an upper box 1, an outer cover 3, a pulverizer 4, an inner cover 5, a filter press 6, a drying granulator 7, a lower box 10, an electrolysis device, a hanging basket 11, a material box 12, an exhaust fan 13, and a linkage mechanism. In some embodiments, the outer cover 3, the pulverizer 4, the inner cover 5, the filter press 6, and the drying granulator 7 may be provided in the upper box 1. The outer cover 3 may be hinged to a top end of the upper box 1. The inner cover 5 may be located above the pulverizer 4.

The upper box 1 refers to a box structure located on an upper end of the centralized treatment device for kitchen waste. In some embodiments, a space of an interior of the upper box 1 located above a horizontal sieve plate 2 may be a smashing area A and a gas treatment area B, and a space of the interior of the upper box 1 located below the horizontal sieve plate 2 may be a waste pretreatment area C and a gas circulation area D.

The smashing area A refers to an area for smashing waste into smaller particles. In some embodiments, the pulverizer 4 may be provided in the smashing area A for pulverizing the waste. The gas treatment area B refers to an area for gas treatment. The gas circulation area D refers to a passageway for gas flow. The gas circulation area D may be connected with the gas treatment area B through sieve holes of the horizontal sieve plate 2. The gas treatment area B may be filled with activated carbon. In some embodiments, gas in the lower box 10 and the upper box 1 may pass through the gas circulation area D to reach the gas treatment area B, and then the gas may be treated with the activated carbon before being discharged from an outlet of the exhaust fan 13. The waste pretreatment area C refers to an area for treating solid and liquid waste. In some embodiments, the waste pretreatment area C may be provided with the filter press 6 and the drying granulator 7.

The outer cover 3 refers to an openable component located at an upper end of the upper box 1. In some embodiments, the outer cover 3 may be configured to cover upper openings of the smashing area A and the gas treatment area B and open the upper openings of the smashing area A and the gas treatment area B when the outer cover 3 is turned upward.

The inner cover 5 refers to an openable component inside the upper box 1. In some embodiments, the inner cover 5 may be hinged in the smashing area A, and the inner cover 5 may be located above the pulverizer 4 for bearing or dumping organic waste.

The pulverizer 4 refers to a device with a pulverizing function. In some embodiments, the pulverizer 4 may be located in the smashing area A for pulverizing the organic waste. An inlet of the pulverizer 4 may face upward, and an outlet of the pulverizer 4 may be connected with a top end of an upper loading channel 8 of the waste pretreatment area C through the sieve holes of the horizontal sieve plate 2.

The filter press 6 refers to a device that squeezes and filters waste. In some embodiments, the filter press 6 may be arranged in the waste pretreatment area C. An inlet of the filter press 6 may be connected with a bottom end of the upper loading channel 8, a liquid outlet of the filter press 6 may be connected with a downcomer 38, and a filter residue outlet of the filter press 6 may be connected with a top opening of a lower loading channel 9. The filter press 6 may be a spiral filter press. A housing of the spiral filter press may be conical, and a cross-section of the housing may gradually decrease in a direction from the inlet to the outlet. As the waste is propelled by a screw, a filter press space may become smaller and smaller, and liquid may be filtered out of sieve holes of the housing of the filter press 6.

The drying granulator 7 refers to a device that dries and compresses waste into a solid. In some embodiments, the drying granulator 7 may be arranged in the waste pretreatment area C. An inlet of the drying granulator 7 may be connected with a bottom end of the lower loading channel 9, and an outlet of the drying granulator 7 may be connected with a bottom end of the waste pretreatment area C. The drying granulator 7 may be a spiral drying granulator.

The lower box 10 refers to a box structure located at a lower end of the centralized treatment device for kitchen waste. In some embodiments, as shown in FIG. 1, an interior of the lower box 10 may be provided with a reservoir area F located on a left side and a degradation area G located on a right side. The reservoir area F refers to a space accommodating an acidic solution, and the degradation area G refers to a space for waste degradation. A space under the reservoir area F and a space of a left side of the degradation area G may be a separation area H. The separation area H refers to an area for separating oil from water in liquid waste. An upper end of the reservoir area F and a bottom end of the gas circulation area D may both be connected with an upper end of the degradation area G, and a lower end of the degradation area G may be connected with a lower end of the reservoir area F. The downcomer 38 may extend to a bottom end of the separation area H and may be connected with the bottom end of the separation area H.

In some embodiments, a bottom end of the upper box 1 may be fixedly connected with a top end of the lower box 10. Both the upper box 1 and the lower box 10 may be cylindrical or rectangular in shape, which are not limited herein.

In some embodiments, a vertical partition 29, a horizontal partition 30, and an inclined partition 31 may be fixed in the lower box 10. A bottom end of the vertical partition 29, a right end of the horizontal partition 30, and a top end of the inclined partition 31 may be fixedly connected with each other. The reservoir area F may be formed between a left side surface of the vertical partition 29, an upper surface of the horizontal partition 30, and an inner wall of the lower box 10. The degradation area G may be formed between a right side surface of the vertical partition 29, a right side surface of the inclined partition 31, and the inner wall of the lower box 10. The separation area H may be formed between a lower surface of the horizontal partition 30, a left side surface of the inclined partition 31, and the inner wall of the lower box 10. A first gap 32 may be provided between a top end of the vertical partition 29 and a top end of the lower box 10. A top end of the reservoir area F may be connected with a top end of the degradation area G through the first gap 32. The inclined partition 31 may be inclined downwards from left to right. A second gap 33 may be provided between a bottom end of the inclined partition 31 and a bottom end of the lower box 10. The bottom end of the separation area H may be connected with the bottom end of the degradation area G through the second gap 33.

In some embodiments, an acidic solution fill hole 39 may be provided on a left side of the top of the lower box 10 for injecting a phosphoric acid hydrogen peroxide mixture into the reservoir area F. Exemplarily, in the phosphoric acid hydrogen peroxide mixture, a mass ratio of phosphoric acid to hydrogen peroxide and water may be (5-8):(0.5-1):10. The phosphoric acid hydrogen peroxide mixture may be made by mixing phosphoric acid (85% commercially available), hydrogen peroxide (30% commercially available), and water. In some embodiments, the reservoir area F may be provided with a liquid drain outlet 34 for discharging a reacted mixture from the reservoir area F to free up space for refilling an acidic solution.

In some embodiments, a vent 40 may be provided at a bottom end of a right side of the degradation area G. When there is an excessive amount of solid residue particles in the degradation area G, the vent 40 may be opened to discharge some of the solid residue particles, and the solid residue particles may be sent to a landfill for unified treatment. The vent 40 may be provided with a detachable sealing plate. The vent 40 may be opened when the sealing plate is detached, and the vent 40 may be blocked when the sealing plate is provided at the vent 40.

In some embodiments, the centralized treatment device for kitchen waste may further include a solid residue smashing device. The solid residue smashing device (not shown in the figures) may be provided at an inlet of the vent 40. The solid residue smashing device refers to a device for breaking down a large solid residue into a small solid residue. Exemplarily, the solid residue smashing device may be a small pulverizer.

In some embodiments of the present disclosure, by providing the solid residue smashing device, large solid residue particles may be broken down into small solid residue particles before the solid residue particles enter the vent 40, preventing the large solid residue particles from blocking the vent 40.

In some embodiments, the liquid drain outlet 34 may be provided at the bottom end of the reservoir area F, and a liquid drain valve 35 may be provided at the liquid drain outlet 34. In some embodiments, an oil drain tube 36 may be connected at a top end of the separation area H, and an oil drain valve 37 may be provided at a top end of the oil drain tube 36. Heights of the oil drain valve 37 and a water drain valve may be the same.

In some embodiments of the present disclosure, oil may be separated and discharged separately by providing the separation area H, thereby facilitating subsequent resource utilization treatment.

The electrolysis device refers to a device for electrolyzing waste for decomposing organic matter in water. In some embodiments, the electrolysis device may be provided in the degradation area G. Further descriptions regarding the electrolysis device may be found hereinafter.

The hanging basket 11 refers to a component for receiving the solid residue particles. In some embodiments, the hanging basket 11 may be hinged in the reservoir area F for receiving the solid residue particles that fall from a bottom of the waste pretreatment area C. The hanging basket 11 may also be movably provided in the reservoir area F through an other feasible connection mode. In some embodiments, the hanging basket 11 may be rotatable around a connection to allow the solid residue particles in the hanging basket 11 to be poured out. In some embodiments, a plurality of through holes may be provided between an inner wall and an outer wall of the hanging basket 11, through which liquid in the solid residue particles may flow out. In some embodiments, a deflector channel 41 may be provided at a left end of the bottom of the waste pretreatment area C. The deflector channel 41 may be inclined downwards from right to left, and an upper opening of the deflector channel 41 may be disposed directly below an outlet of the drying granulator 7. A lower opening of the deflector channel 41 may be located above the hanging basket 11, and the lower opening of the deflector channel 41 may face the hanging basket 11. Through such structure, the hanging basket 11 may receive the solid residue particles that fall from the outlet of the drying granulator 7 and/or from the bottom of the waste pretreatment area C.

Figure 3:
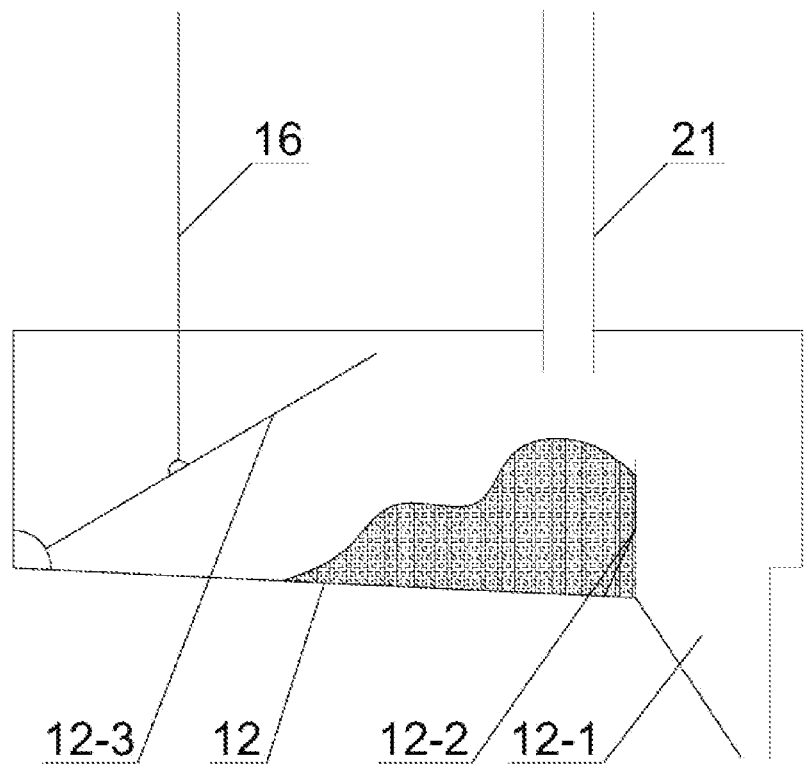
FIG. 3 is a schematic diagram illustrating an exemplary structure of a material box and an interior thereof of a centralized treatment device for kitchen waste according to some embodiments of the present disclosure.

FIG. 3 is a schematic diagram illustrating an exemplary structure of a material box and an interior thereof of a centralized treatment device for kitchen waste according to some embodiments of the present disclosure.

The material box 12 refers to a box component for holding a powder treatment agent. In some embodiments, the material box 12 may be fixedly mounted in the waste pretreatment area C. As shown in FIG. 3, a fan blade 123 may be hinged in the material box 12. The fan blade 123 may be configured to allow the treatment powder agent to flow out from a discharge outlet 121 of the material box 12. The discharge outlet 121 of the material box 12 may be located directly above a top opening of the lower loading channel 9.

The treatment powder agent may be used to solidify and granulate filter residues to form the solid residue particles. In some embodiments, the treatment powder agent may be a composite treatment powder agent. The composite treatment powder agent may be blended powder composed of calcium oxide, bentonite, iron oxide, cement, and carbon powder.

The exhaust fan 13 refers to a device for extracting gas for exhausting. In some embodiments, one end of the exhaust fan 13 may be connected with a top end of the gas treatment area B, and an other end of the exhaust fan 13 may be connected with the outside. In some embodiments, a gas composition monitoring device may be provided at an outlet of the exhaust fan 13. More descriptions regarding the gas composition monitoring device may be may be found hereinafter.

In some embodiments of the present disclosure, odorless gas treatment may be realized in time during the treatment process by providing the exhaust fan without air pollution.

The linkage mechanism refers to a device that links the hanging basket 11, the inner cover 5, and the fan blade 12-3. In some embodiments, the linkage mechanism may include a first transmission rope 14, a second transmission rope 15, and a transmission rod 16. A right end of the outer cover 3 may be hinged to a top end of the upper box 1, an upper end of the first transmission rope 14 may be fixedly connected with a left end of the outer cover 3, and a lower end of the first transmission rope 14 may be fixedly connected with a left end of the hanging basket 11. A right end of the inner cover 5 may be hinged to a first short partition 18, an upper end of the second transmission rope 15 may be fixedly connected with a middle part of the outer cover 3, and a lower end of the second transmission rope 15 may be fixedly connected with a left end of the inner cover 5. An upper end of the transmission rod 16 may be hinged to the middle part of the outer cover 3, a lower end of the transmission rod 16 may be hinged to the fan blade 12-3, and a left end of the fan blade 12-3 may be hinged to a bottom of the material box 12. In some embodiments, the hanging basket 11, the inner cover 5, and the fan blade 12-3 may all be inclined downwards from right to left when the outer cover 3 covers the upper opening of the smashing area A.

In some embodiments, the electrolysis device may include a first electrolysis electrode plate 22, a soft rope filler 23, and a second electrolysis electrode plate 24. Both the first electrolysis electrode plate 22 and the second electrolysis electrode plate 24 may be provided in the degradation area G. The soft rope filter 23 may be provided between the first electrolysis electrode plate 22 and the second electrolysis electrode plate 24. Under an action of the first electrolysis electrode plate 22 and the second electrolysis electrode plate 24, organic matter in the water may be decomposed, and the soft rope filter 23 may be filmed to form a biofilm after a period of time, and the biofilm may degrade pollutants in the water.

In some embodiments, when the solid residue particles in the degradation area G increasingly accumulate and fill between the first electrolysis electrode plate 22 and the second electrolysis electrode plate 24, the solid residue particles between the two electrodes may form a three-dimensional electrode for electrolysis due to the carbon in the solid residue particles.

In some embodiments of the present disclosure, smashed kitchen waste may be subjected to solid-liquid separation through the filter press. Filter residues may enter the drying granulator to be partially carbonized, and carbonized filter residues and the mixed powder treatment agent may form the solid residue particles. The solid residue particles may adsorb and degrade pollutants in a separating liquid after acid washing and activation. Meanwhile, through the electrolysis device, the accumulated solid residue particles may form a multi-dimensional electrode between the electrodes, which helps to degrade the pollutants in the water and realizes treating waste with waste. The solid residue particles discharged after treatment may be subjected to subsequent resource utilization treatment.

In some embodiments, a long partition 17 may be fixed in the upper box 1. The long partition 17 may divide an interior of the upper box 1 into a transmission area E located on a left side and a treatment area located on a right side. The first transmission rope 14 may pass through the transmission area E. The horizontal sieve plate 2 may be located in the treatment area. A space of the treatment area located above the horizontal partition 30 may be divided into the smashing area A on the left side and the gas treatment area B on the right side by the first short partition 18. A space of the treatment area located below the horizontal partition may be divided into the waste pretreatment area C located on the left side and the gas circulation area D located on the right side by a second short partition 19.

In some embodiments, the first short partition 18 may be located in a middle part of the horizontal sieve plate 2, and the second short partition 19 may be located at a right end of the horizontal sieve plate 2, thereby increasing the space of the waste pretreatment area C.

In some embodiments, guide wheels 20 may be rotatably provided on upper and lower ends of a left side surface of the long partition 17, and a guide wheel 20 may also be rotatably provided on a left side surface of the first short partition 18. The first transmission rope 14 may be wound sequentially around the guide wheels 20 on the upper and lower ends of the left side surface of the long partition 17. A bottom end of the first transmission rope 14 may be fixedly connected to a left end of the hanging basket 11, and a right end of the hanging basket 11 may be hinged to the reservoir area F. The second transmission rope 15 may be wound around the guide wheel 20 on the left side surface of the first short partition 18. A left end of the second transmission rope 15 may be fixedly connected with a left end of the inner cover 5, and a right end of the inner cover 5 may be hinged to the first short partition 18. The transmission rod 16 may pass through the gas treatment area B. Through the structure, the first transmission rope 14 and the second transmission rope 15 may move in accordance with preset paths, thereby improving the reliability of transmission.

In some embodiments of the present disclosure, when the outer cover is opened, the hanging basket 11 may be turned upwardly by an action of the first transmission rope 14 to automatically dump the solid residue particles therein into the degradation area G. The inner cover 5 may be turned upwardly to be nearly horizontal by an action of the second transmission rope 15 to hold the organic waste (e.g., kitchen waste) dumped from the upper end of the smashing area A, reducing a probability that odor inside the lower box 10 and the upper box 1 may spill outwardly. The fan blade 12-3 may be turned upwardly by an action of the transmission rod 16 to form an airflow to blow the powder treatment agent inside the material box 12, so that the powder treatment agent may flow from the discharge outlet 12-1 into the top opening of the lower loading channel 9, and then reach the drying granulator 7. When the outer cover 3 is opened, the exhaust fan 13 may extract gas inside the lower box 10 and the upper box 1 to form a negative pressure environment, so that outside air may flow from the upper end of the smashing area A into the upper box 1, and finally be discharged from an outlet of the exhaust fan 13 after being treated with the activated carbon in the gas treatment area B, thereby reducing a probability that the odor spills outwardly from the smashing area when the outer cover 3 is opened and discharging the gas after gas treatment.

In some embodiments, a downwardly extending vertical plate 25 may be fixed at a top end of the degradation area G. A horizontal plate 26 may be fixed on a right side surface of the vertical plate 25. A plurality of filter holes may be disposed in both the vertical plate 25 and the horizontal plate 26. A filtration area I may be formed by a space between a right side surface of the vertical plate 25, an upper surface of the horizontal plate 26, and an inner wall of the box. A water drain outlet 27 may be provided at a bottom end of the filtration area I, and a water drain valve 28 may be provided at the water drain outlet 27.

In some embodiments, top ends of the first electrolysis electrode plate 22, the soft rope filler 23, and the second electrolysis electrode plate 24 may be fixed to a lower surface of the horizontal plate 26. In some embodiments, the horizontal plate 26 may be fixed to a middle part of the vertical plate 25. A bottom end of the horizontal plate 26 may extend to a middle part of the lower box 10. The first electrolysis electrode plate 22 and the second electrolysis electrode plate 24 may both be located on a right side of the vertical plate 25. The first electrolysis electrode plate 22 and the second electrolysis electrode plate 24 may be connected with a positive pole and a negative pole of a DC power supply, respectively.

In some embodiments, a feed tube 21 may be provided in the gas treatment area B. As shown in FIG. 3, a bottom end of the feed tube 21 may be connected with the material box 12. The fan blade 12-3 and the discharge outlet 12-1 may be located at two ends of the material box 12. The discharge outlet 12-1 may be located at the bottom end of the material box 12. A baffle plate 12-2 may be provided on a side of the discharge outlet 12-1 close to the fan blade 12-3. A height of the baffle plate 12-2 may be lower than a height of an inner wall of the material box 12. In some embodiments, an upper end of the material box 12 may be an open structure or a blocking structure. In some embodiments, the material box 12 may be rectangular. When the upper end of the material box 12 is the blocking structure, a long groove for movement of the transmission rod 16 may be provided at the top end of the material box 12. The powder treatment agent may be filled into the material box 12 from the feed tube 21. When the fan blade 12-3 is turned upwards and downwards, an airflow may be formed to blow the powder treatment agent inside the material box 12 over the top end of the baffle plate 12-2 to flow out from the discharge outlet 12-1 into the drying granulator 7. The filter residues may react with the powder treatment agent in the drying granulator 7 to obtain the solid residue particles, and then the solid residue particles may be exported from the outlet of the drying granulator 7.

In some embodiments, the centralized treatment device for kitchen waste may further include a driving device. The driving device refers to a device for driving the outer cover 3 to open or close. The driving device may have various structures, which are not limited herein. For example, the driving device may adopt a linear reciprocating motion mechanism with one end of the linear reciprocating motion mechanism hinged to the outer cover 3, and an other end of the linear reciprocating motion mechanism hinged to the upper box 1. For example, the linear reciprocating motion mechanism may specifically adopt an electric actuator, an air cylinder, or a hydraulic cylinder.

In some embodiments, each of the reservoir area F, the separation area H, the filtration area I, and the degradation area G may be provided with a transparent viewing window to allow for viewing respective internal treatment.

In some embodiments, a magnetic time-delay switch may be provided between the outer cover 3 and the upper box 1, and control circuits of the pulverizer 4, the filter press 6, and the drying granulator 7 may be electrically connected to the magnetic time-delay switch. When a cover plate is closed, the magnetic time-delay switch may be closed, and the pulverizer 4, the filter press 6, and the drying granulator 7 may be turned on, a time for turning on being controlled to be within a range of 2 min to 5 min. Power supplies of the exhaust fan 13, the first electrolysis electrode plate 22, and the second electrolysis electrode plate 24 may be connected externally.

In some embodiments, the centralized treatment device for kitchen waste may further include a gas composition monitoring device, such as a gas analyzer. In some embodiments, the gas composition monitoring device may be deployed in the gas treatment area B or at the outlet of the exhaust fan 13 in the gas circulation area D. The gas composition monitoring device may be configured to monitor a gas composition of untreated gas in the gas treatment area B and to monitor a gas composition of treated gas at the outlet of the exhaust fan 13.

In some embodiments, the centralized treatment device for kitchen waste may further include a processor configured to process data related to functions of the centralized treatment device for kitchen waste. The processor may be communicatively connected to the gas composition monitoring device.

In some embodiments, the processor may determine whether the activated carbon in the gas treatment area B fails by comparing gas composition change data of the untreated gas and the treated gas. The gas composition change data may be comparative data of each composition, or weighted data of change in each composition. Merely by way of example, the change data may be calculated by a formula:

$$Q = \sum_{i=1}^{n} m_i \times n_i.$$

Where Q denotes the change data, mi denotes a coefficient of a gas composition i, and $n_i$ denotes change data of a gas composition i. The coefficient mi may be preset manually. For example, the more harmful a gas composition to the environment, the larger the coefficient corresponding to the gas composition. The gas composition change data may be a difference between proportions of a gas composition in the untreated gas and the same gas composition in the treated gas. A gas composition that exists only in the untreated gas or a gas composition that exists only in the treated gas may be counted as 0.

In some embodiments, the processor may determine that the activated carbon in the gas treatment area B fails in response to the change data being less than a threshold, and issue an early warning. The early warning may be a sound or a display of an early warning message through a display device for alerting an operator who may then replace the activated carbon in accordance with the alert.

A working process of the centralized treatment device for kitchen waste provided by some embodiments of the present disclosure may include following operations.

The operator may fill the reservoir area F with a mixture. Specifically, the operator may fill the reservoir area F with a phosphoric acid hydrogen peroxide mixture through the acidic solution fill hole 39 until a liquid level of the mixture rises to a position that is 3 cm to 5 cm from a top end of the vertical partition 29 (not yet reaching the top end of the vertical partition 29), and add a small amount of litmus indicator to indicate acidity of the mixture. When the acidity of the mixture in the reservoir area F is too weak, the mixture may be discharged from the liquid drain outlet 34, and the operator may re-fill the phosphoric acid hydrogen peroxide mixture through the fill hole, usually consuming 10 ml-30 ml of the mixture per kilogram of kitchen waste. A liquid discharged from the liquid drain outlet 34 may be added to the smashing area A of the upper box 1 for reuse with the kitchen waste to be treated.

Power supplies of the exhaust fan 13, the first electrolysis electrode plate 22, and the second electrolysis electrode plate 24 may be started.

The kitchen waste may be poured into the smashing area A, and the kitchen waste may pass through the pulverizer 4, the filter press 6, and the drying granulator 7 to be separated into filter residues and liquid. Specifically, the driving device may drive the outer cover 3 to turn upwards to open, and the inner cover 5 may automatically turn upwards with the outer cover 3 to be parallel to a horizontal plane under an action of the second transmission rope 15. Then the kitchen waste poured into the smashing area A may fall on the inner cover 5, thereby reducing outward gas overflow from the upper box 1 and the lower box 10. Subsequently, the driving device may drive the outer cover 3 to close, the inner cover 5 may turn downwards and reset under the effect of gravity, and the kitchen waste may enter into the pulverizer 4. Then the pulverizer 4, the filter press 6, and the drying granulator 7 may begin to work. After the kitchen waste is smashed by the pulverizer 4, the kitchen waste may enter into the filter press 6 through the sieve holes of the horizontal sieve plate 2 under guidance of the upper loading channel 8, and then a filtered liquid may flow into the downcomer 38.

The filter residues separated from the kitchen waste may be dried and granulated by the drying granulator 7 to form the solid residue particles. The solid residue particles may fall into the hanging basket 11, and enter the degradation area G after soaking, reacting, and decomposing in the reservoir area F.

Specifically, firstly, the filter residues filtered by the filter press 6 may fall into the lower loading channel 9, and then slide down the lower loading channel 9 to the inlet of the drying granulator 7. Before the filter residues fall into the inlet of the drying granulator 7, as the outer cover 3 opens and then closes, the transmission rod 16 may drive the fan blade 12-3 to blow part of the composite powder treatment agent into the inlet of the drying granulator 7. A temperature of the drying granulator 7 may be controlled to be within a range of 300° C. to 400° C., and organic matter entering the filter residues may be carbonized. Meanwhile, the filter residues and the composite powder treatment agent may be mixed, cured, and granulated in the drying granulator 7 to form the solid residue particles.

Then, the solid residue particles may fall into the hanging basket 11 along the deflector channel 41. When the outer cover 3 is closed, the hanging basket 11 may be immersed in the phosphoric acid hydrogen peroxide mixture in the reservoir area F. After the solid residue particles in the hanging basket 11 are immersed and reacted, substances such as cellulose, calcium, etc., therein may react with the phosphoric acid hydrogen peroxide mixture. On the one hand, microorganisms may be used more easily to make a decomposition process more thorough in a next stage, and on the other hand, after the decomposition process, porous materials may be formed, which may adsorb pollutants in a liquid to be treated. When the outer cover 3 is opened, the hanging basket 11 may be turned upwards under a driving force of the first transmission rope 14, and the solid residue particles in the hanging basket 11 soaked in the acidic solution may slide downwards into the bottom of the degradation area G along the vertical partition 29 and the inclined partition 31. When the outer cover 3 is closed, the hanging basket 11 may be reset under the effect of gravity.

The liquid filtered from the filter press 6 may be subjected to an oil-water separation in the separation area H. Specifically, the liquid filtered from the filter press 6 may enter the downcomer 38 and then flow into the separation area H, where the oil-water separation may be carried out. When oil accumulates too much, the oil may enter the oil drain tube 36. The oil drain valve 37 may be opened to discharge the oil, and then the oil may be collected for utilization. The water may flow downwards 33 into the degradation area G through the second gap. Under the action of the first electrolysis electrode plate 22 and the second electrolysis electrode plate 24, the organic matter in the water may be decomposed. After the soft rope filler 23 is filmed for a period of time, the formed biofilm may degrade the pollutants in the water.

When the solid residue particles increasingly accumulate in the degradation area G, the solid residue particles may form a three-dimensional electrode for electrolysis. Specifically, when the solid residue particles fall down and pile up at the bottom of the degradation area G, the solid residue particles may act as a good layer for adsorption and filtration, which adsorbs the organic matter in the liquid of the degradation area G. Meanwhile, the microorganisms in the liquid of the degradation area G at the bottom may grow on surfaces of the solid residue particles, thereby forming a biofilm on the surface. When the solid residue particles are increasingly piled up to fill up between the first electrolysis electrode plate 22 and the second electrolysis electrode plate 24, the solid residue particles may form the three-dimensional electrode between the first electrolysis electrode plate 22 and the second electrolysis electrode plate 24 for electrolysis due to the carbon in the solid residue particles. When the solid residue particles accumulate too much, the vent 40 may be opened to discharge part of the solid residue particles and send the solid residue particles to the landfill for unified treatment.

After the water is treated, a water level of the degradation area G may rise. After the treated water is filtered by the horizontal plate 26 and the vertical plate 25, the treated water may reach the filtration area I for filtration. After the water drain valve 28 is opened, the filtered water may flow out from the water drain outlet 27.

The exhaust fan 13 may extract the gas from the lower box 10 and the upper box 1. The gas may reach the gas treatment area B through the gas circulation area D and be discharged from the outlet of the exhaust fan 13 after being treated with the activated carbon, thereby reducing the probability that the odor spills outwardly from the smashing area A when the outer cover 3 is opened and discharging the gas after gas treatment.

Some embodiments of the present disclosure provide the centralized treatment device for kitchen waste capable of efficiently separating solids, oils, gas, and water from the smashed kitchen waste before separately treating and discharging, which may facilitate subsequent resourceful treatment. At the same time, the oil obtained by separation may be recycled, which has a certain economic value. The kitchen waste may be greatly reduced in size after dehydration, drying, and carbonization, making an obvious effect of waste reduction, and eliminating an increasingly stressful process of landfilling. Organic pollutants may be degraded in a plurality of ways, allowing the kitchen waste to be harmlessly treated in time. The waste treatment process may not affect municipal sewer lines or pollute the air. In addition, during a process of opening or closing the outer cover of the centralized treatment device for kitchen waste, the inner cover may bear or dump the kitchen waste accordingly with the outer pipe, the hanging basket may bear or dump or the solid residue particles accordingly with the outer tube, and the fan blade may blow up and down accordingly with the outer cover to provide the powder treatment agent for the drying granulator, so that the whole linkage mechanism is simple in structure and low in cost.

In some embodiments, the electrolysis device may further include an acidic solution replenishment system and a temperature monitoring device. The acidic solution replenishment system may be configured to replenish the degradation area G with acid. Merely by way of example, the acidic solution replenishment system may include a liquid delivery device. By providing the liquid delivery device between the reservoir area F and the degradation area G, a mixture stored in the reservoir area F may be delivered to the degradation area G for acid replenishment in the degradation area G. The temperature monitoring device may be configured to monitor a temperature of the degradation area G. For example, the temperature monitoring device may be a temperature sensor. In some embodiments, the centralized treatment device for kitchen waste may further include a pH monitoring device. The pH monitoring device may be disposed in the degradation area G for obtaining pH monitoring data of the degradation area G.

In some embodiments, the processor may be communicatively connected with the acidic solution replenishment system, the temperature monitoring device, and the pH monitoring device. The processor may determine an acidic solution pH replenishment scheme based on the pH monitoring data. The processor may then issue a control instruction to control the acidic solution replenishment system to deliver the mixed acidic solution from the reservoir area F to the degradation area G based on the acidic solution pH replenishment scheme.

An effect of the activated carbon in adsorbing the organic pollutants from water decreases with an increase in a pH value of the solution, and the organic pollutants are less likely to be adsorbed on the activated carbon when the pH value is higher than 9.0. Meanwhile, with a process of electrolysis, the pH value of the solution is changed by an electrolysis reaction. Therefore, it is necessary to reasonably control the pH value of the acidic solution in the degradation area G. In some embodiments, the acidic solution pH replenishment scheme may allow for timely acidic solution replenishment to maintain the pH value within a preset range when the pH value of the acidic solution in the degradation area G is greater than a preset threshold.

In some embodiments, the acidic solution pH replenishment scheme may include a future replenishment time point and an acidic solution replenishment volume. The future replenishment time point refers to a future time point after a current time point at which a replenishment operation is performed. The acidic solution replenishment volume refers to an amount of a mixture to be specifically replenished when the replenishment operation is performed. The acidic solution replenishment volume may be measured in terms of mass, volume, etc. Merely by way of example, the acidic solution pH replenishment scheme may be to replenish 10 ml of the mixture in an hour after the current time.

In some embodiments, the processor may determine the acidic solution pH replenishment scheme through a plurality of feasible schemes. For example, the acidic solution pH replenishment scheme may be determined based on human experience, a preset algorithm, a model, etc.

In some embodiments, the processor may determine the future replenishment time point and a pH value of a target acidic solution through a replenishment scheme determination model by processing the pH monitoring data, a pH fluctuation amplitude, a temperature of a current degradation area G, a pH value of a current replenishment solution, a liquid volume of a current degradation area G, and at least one set of preset replenishment volumes; and determine the replenishment volume based on the pH value of the target acidic solution.

The pH fluctuation amplitude refers to an amplitude of pH fluctuation of an acidic solution within a certain time range. The pH fluctuation amplitude may include an increasing amplitude and a decreasing amplitude, which are expressed as positive and negative values respectively. In some embodiments, the processor may determine the pH fluctuation amplitude in a plurality of ways based on the pH monitoring data obtained by the pH monitoring device. For example, the processor may determine a percentage of a maximum value larger than initial pH monitoring data to the initial pH monitoring data in a pH monitoring data sequence obtained consecutively at a certain time interval as the increasing amplitude of the pH fluctuation amplitude. As another example, the processor may determine a percentage of a minimum value less than the initial pH monitoring data to the initial monitoring data in the pH monitoring data sequence obtained consecutively at the certain time interval as the decreasing amplitude of the pH fluctuation amplitude. The temperature of the current degradation area G may be obtained by the temperature monitoring device. The liquid volume of the current degradation area G may be measured by a buoy. The at least one set of preset replenishment volumes refer to at least one set of preset replenishment volumes of the acidic solution (mixture). In some embodiments, the processor may determine the at least one set of preset replenishment volumes based on acidic solution consumption per unit time in conjunction with historical production data or random generation. Merely by way of example, the processor may generate the at least one set of preset replenishment volumes based on a random increase or a random decrease in an average value of a historical replenishment volume. The pH value of the target acidic solution refers to a pH value of the degradation area G after the acidic solution is replenished with a preset replenishment volume at the future replenishment time point. In some embodiments, the pH value of the target acidic solution may be a range value.

The replenishment scheme determination model refers to a model for determining the pH value of the target acidic solution. In some embodiments, the replenishment scheme determination model may be a machine learning model.

In some embodiments, the replenishment scheme determination model may include a time point prediction layer and a determination layer. The time point prediction layer may be used to determine the future replenishment time point. In some embodiments, an input of the time point prediction layer may include the pH monitoring data, the pH fluctuation amplitude, and the temperature of the current degradation area G. An output of the time point prediction layer may include the future replenishment time point. In some embodiments, the time point prediction layer may be a Long Short-Term Memory (LSTM) network model. The determination layer may be used to determine the pH value of the target acidic solution. In some embodiments, an input of the determination layer may include the pH value of the current replenishment solution, the liquid volume of the current degradation area G, the at least one set of preset replenishment volumes, and the future replenishment point output from the time point prediction layer. An output of the determination layer may include the pH value of the target acidic solution. In some embodiments, the determination layer may be a neural network (NN) model.

In some embodiments, the time point prediction layer and the determination layer may be obtained by joint training. In some embodiments, first training samples of the joint training may include sample pH monitoring data, sample pH fluctuation amplitudes, sample temperatures of a degradation area G, sample pH values of a replenishment solution, sample liquid volumes of a degradation area G, and sample preset replenishment volumes. First labels may be sample pH values of a target acidic solution. The first training samples may be obtained based on historical data. The first labels of the first training samples may be obtained based on actual historical pH values of a target acidic solution corresponding to the sample data in the historical data.

The future replenishment time point output from the time point prediction layer may be obtained by inputting the sample pH monitoring data, the sample pH fluctuation amplitudes, and the sample temperatures of the degradation area G into the time point prediction layer to obtain. The pH value of the target acidic solution output from the determination layer may be obtained by using the future replenishment time point as the training sample data and inputting the sample pH values of the replenishment solution, the sample liquid volumes of the degradation area G, and the sample preset replenishment volumes into the determination layer. A loss function may be constructed based on the sample pH value of the target acidic solution and the pH value of the target acidic solution output from the determination layer, and parameters of the time point prediction layer and the determination layer may be synchronously updated. A trained time point prediction layer and a trained determination layer may be obtained by updating the parameters.

In some embodiments, the processor may determine the preset replenishment volume corresponding to the pH value of the target acidic solution as the acidic replenishment volume when the pH value of the target acidic solution output from the determination layer satisfies a preset range. In some embodiments, the acidic solution pH replenishment scheme may be formed based on the future replenishment time point and the acidic solution replenishment volume obtained by the replenishment scheme determination model. The processor may issue a control instruction based on the acidic solution pH replenishment scheme to control an acidic solution pH replenishment device to deliver the mixture from the reservoir area F to the degradation area G.

The future replenishment time point and the pH value of the target acidic solution may be determined through the replenishment scheme determination model in some embodiments of the present disclosure by processing the pH monitoring data, the temperature of the current degradation area G, and the at least one set of preset replenishment volumes, and then the replenishment volume may be determined, which may simultaneously consider effects of a plurality of factors, so that the future replenishment time point and the replenishment volume may be determined efficiently and accurately, and errors in manual determination may be avoided.

In some embodiments, the pH monitoring device may be provided in the reservoir area F for monitoring the acidity of the mixture in the reservoir area F. The pH monitoring device may be an acid meter. Merely by way of example, the pH monitoring device (not shown in the figures) may be disposed in a position of the reservoir area F away from the acidic solution fill hole 39. In some embodiments, the processor may be communicatively connected with a plurality of valves in the centralized treatment device for kitchen waste to control, for example, filling and draining of liquid by controlling opening and closing of the valves.

In some embodiments, the processor may control the liquid drain outlet 34 to open and discharge the mixture in response to the acidity of the mixture in the reservoir area F being less than or exceeding a preset acidity interval. In some embodiments, the processor may control the acidic solution fill hole 39 to fill the reservoir area F with the phosphoric acid hydrogen peroxide mixture. In some embodiments, the processor may close the liquid drain outlet 34 and the acidic solution fill hole 39 in response to the liquid level of the mixture or the acidity of the mixture meeting a preset condition. In some embodiments, the preset condition may be determined based on the preset algorithm, historical experience, etc. For example, the preset condition may be that the liquid level of the mixture is 3 cm from the top end of the vertical partition 29, in this case, it is necessary to avoid the mixture from being too full to overflow the reservoir area F. As another example, the preset condition may be that a pH value of the mixture is less than 4.5, in this case, the acidity of the mixture may be sufficient, and the mixture may not be required anymore.

The solid residue particles may adsorb and degrade the pollutants in the separating liquid after acid cleaning and activation, and the acidity of the mixture may have an important effect on the process of adsorption and degradation. Therefore, in some embodiments of the present disclosure, the acidity of the mixture may be kept at an optimal level all the time through the pH monitoring device and controlling the acidity of the mixture, thereby promoting efficiency.

In some embodiments, the processor may determine whether to end soaking the solid residue particles in the reservoir area F based on pH value change data in the reservoir area F. Merely by way of example, a pH value of the reservoir area F may change during the reaction process of the solid residue particles. When the reaction is completed, the pH value of the reservoir area F may not change any longer. When the pH value of the reservoir area F does not change any longer, soaking the solid residue particles in the reservoir area F may be ended, thereby reducing ineffective time of the waste treatment process.

In some embodiments, the centralized treatment device for kitchen waste may further include a solid residue particle monitoring device. The solid residue particle monitoring device refers to a device for monitoring a volume of the solid residue particles. Merely by way of example, the solid residue particle monitoring device may be an optical sensor or a photometer capable of measuring absorbance of a solid-liquid mixture. Based on a difference in an absorption degree of light at a particular wavelength by a solid and a liquid, the optical sensor or the photometer may measure the volume of the solid residue particles. The solid residue particle monitoring device may be communicatively connected with the processor.

In some embodiments, when the volume of the solid residue particles in the degradation area G is located between the first electrolysis electrode plate 22 and the second electrolysis electrode plate 24, the solid residue particles may form a surface-charged working electrode between the two electrodes due to the carbon in the solid residue particles, i.e., the three-dimensional electrode, for electrolysis. In some embodiments, the processor may control the electrolysis reaction in conjunction with the electrolysis device in response to the volume of the solid residue particles being located between the first electrolysis electrode plate 22 and the second electrolysis electrode plate 24. Merely by way of example, when the volume of the solid residue particles is located between the first electrolysis electrode plate 22 and the second electrolysis electrode plate 24, a current magnitude of the first electrolysis electrode plate 22 and the second electrolysis electrode plate 24 may be adjusted to maintain an optimal electrolysis efficiency of the electrolysis reaction.

In some embodiments, the processor may open the vent 40 to automatically discharge the solid residue particles in response to the volume of the solid residue particles monitored by the solid residue particle monitoring device exceeding a threshold value.

In some embodiments, the processor may determine an electrolysis efficiency based on the volume of the solid residue particles and the pH value of the mixture; and adjust the current magnitude of electrolysis based on the electrolysis efficiency.

The electrolysis efficiency refers to a rate at which the electrolysis device performs electrolytic treatment. In some embodiments, the electrolysis efficiency may be assessed by monitoring a change rate of a pH value and an increasing rate of the volume of the solid residue particles during the electrolysis reaction, and the electrolysis efficiency may also be assessed by comparing concentrations or contents of the organic matter at a beginning and an end of the electrolysis.

In some embodiments, an electrolysis efficiency sequence including a plurality of electrolysis efficiencies may be obtained by looking up a table corresponding to change rates of the pH value, and increasing rates of the volume of the solid residue particles in a plurality of time intervals.

In some embodiments, if there is no corresponding electrolysis efficiency in a preset table, the electrolysis efficiency may be determined by an electrolysis efficiency prediction algorithm. The electrolysis efficiency prediction algorithm may include building a function based on the change rate of the pH value in the degradation area G, the increasing rate of the volume of the solid residue particles, and the electrolysis efficiency by data fitting. Merely by way of example, a formula of the electrolysis efficiency prediction algorithm is $y=a*x_1+b*x_2$. Where y denotes the electrolysis efficiency, $x_1$ denotes the change rate of the pH value, $x_2$ denotes the increasing rate of the solid residue particles, and a and b denote weights for fitting data.

In some embodiments, the processor may adjust a present current in response to the electrolysis efficiency being less than an efficiency threshold. In some embodiments, when the electrolysis efficiency is less than the efficiency threshold, the current may be gradually increased until the electrolysis efficiency is greater than the efficiency threshold, and then a present current magnitude may be maintained.

In some embodiments, the processor may determine a current magnitude based on a current data determination model.

In some embodiments, the current data determination model may be a machine learning model. For example, the current data determination model may be a recurrent neural network (RNN) model, etc.

In some embodiments, an input of the current data determination model may include an electrolysis efficiency sequence, a temperature change sequence of a current degradation area G, a current pH value change sequence, a liquid volume change sequence of a current degradation area G, and a volume change sequence of current solid residue particles in a current degradation area G. An output of the current data determination model may include a recommended electrolysis current magnitude. The electrolysis efficiency sequence may be found in the previous description. The temperature change sequence of the current degradation area G, the current pH value change sequence, the liquid volume change sequence of the current degradation area G, and the volume change sequence of the current solid residue particles in the current degradation area G may be data sequences formed by monitoring results of a plurality of time points in a current period of time. Descriptions regarding obtaining the monitoring results may be found hereinabove.

In some embodiments, the current data determination model may be obtained by training based on a plurality of second training samples with second labels. In some embodiments, the second training samples may include sample electrolysis efficiency sequences, sample temperature change sequences, sample pH value change sequences, sample liquid volumes, and sample volume change sequences of solid residue particles. The second labels may include the electrolysis current magnitude corresponding to samples. In some embodiments, a current magnitude with the highest electrolysis efficiency may be selected as a label by experimenting with the samples using a plurality of current magnitudes. The second labels may be manually labeled.

In some embodiments, the current data determination model may be trained based on the samples described above in a plurality of ways to update model parameters. For example, the current data determination model may be trained based on a gradient descent algorithm. In some embodiments, the training may end when a trained current data determination model satisfies a preset condition. The preset condition may be that a result of a loss function converges or is less than a preset threshold, etc.

In some embodiments of the present disclosure, the electrolysis current magnitude may be determined through the current data determination model, which can accurately predict the electrolysis current magnitude that satisfies the condition and rapidly and effectively determine the electrolysis current magnitude.

In some embodiments, the electrolysis efficiency may also be correlated to energy efficiency. When the electrolysis efficiency satisfies the preset condition, power of the electrolysis device may be adjusted, so that the power of the electrolysis device may be minimum, and energy conservation may be realized.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A centralized treatment device for kitchen waste, comprising:
    an upper box, with a horizontal sieve plate fixed inside, provided with a smashing area and a gas treatment area located above the horizontal sieve plate, and a waste pretreatment area and a gas circulation area located below the horizontal sieve plate; wherein the gas circulation area is connected with the gas treatment area through sieve holes of the horizontal sieve plate, and the gas treatment area is filled with activated carbon;
    an outer cover hinged to a top end of the upper box and configured to cover upper openings of the smashing area and the gas treatment area and open the upper openings of the smashing area and the gas treatment area when the outer cover is turned upward;
    a pulverizer located in the smashing area, wherein an inlet of the pulverizer faces upward, and an outlet of the pulverizer is connected with a top end of an upper loading channel of the waste pretreatment area through the sieve holes of the horizontal sieve plate;
    an inner cover hinged in the smashing area and located above the pulverizer and configured to bear or dump organic waste;
    a filter press mounted in the waste pretreatment area, wherein an inlet of the filter press is connected with a bottom end of the upper loading channel, a liquid outlet of the filter press is connected with a downcomer, a filtrate outlet of the filter press is connected with the downcomer, and a filter residue outlet of the filter press is connected with a top opening of a lower loading channel;
    a drying granulator mounted in the waste pretreatment area, wherein an inlet of the drying granulator is connected with a bottom end of the lower loading channel, and an outlet of the drying granulator is connected with a bottom end of the waste pretreatment area;
    a lower box internally provided with a reservoir area located on a left side for accommodating an acidic solution and a degradation area located on a right side, wherein a separation area located on a left side of the degradation area is arranged below the reservoir area; an upper end of the reservoir area and a bottom end of the gas circulation area are both connected with an upper end of the degradation area, and a lower end of the degradation area is connected with a lower end of the reservoir area; the downcomer extends to a bottom end of the separation area and is connected with the bottom end of the separation area; and a bottom end of the upper box is fixedly connected with a top end of the lower box;
    an electrolysis device provided in the degradation area and configured to decompose organic matter in water;
    a hanging basket hinged in the reservoir area and configured to receive solid residue particles falling from a bottom of the waste pretreatment area, wherein a plurality of through holes are provided between an inner wall and an outer wall of the hanging basket;
    a material box fixedly mounted in the waste pretreatment area and configured to store a powder treatment agent, wherein a fan blade configured to allow the power treatment agent to flow out from a discharge outlet of the material box is hinged in the material box, and the discharge outlet of the material box is located directly above the top opening of the lower loading channel;
    an exhaust fan, one end of which is connected with a top end of the gas treatment area, and an other end of which is connected with the outside; and
    a linkage mechanism including a first transmission rope, a second transmission rope, and a transmission rod, wherein two ends of the first transmission rope are fixedly connected with the outer cover and the hanging basket respectively, two ends of the second transmission rope are fixedly connected with the outer cover and the inner cover respectively, and two ends of the transmission rod are hinged to the outer cover and the fan blade respectively; and when the outer cover blocks the upper opening of the smashing area, the hanging basket, the inner cover, and the fan blade are all inclined downwardly from right to left.

2. The centralized treatment device for kitchen waste of claim 1, wherein a long partition is fixed inside the upper box, and the long partition divides an interior of the upper box into a transmission area located on a left side and a treatment area located on a right side;
    the first transmission rope passes through the transmission area;
    the horizontal sieve plate is located in the treatment area, a space of the treatment area located above a horizontal partition is divided into the smashing area located on the left side and the gas treatment area located on the right side by a first short partition; and
    a space of the treatment area located below the horizontal partition is divided into the waste pretreatment area located on the left side and the gas circulation area located on the right side by a second short partition.

3. The centralized treatment device for kitchen waste of claim 2, wherein the first short partition is located in a middle part of the horizontal sieve plate, and the second short partition is located at a right end of the horizontal sieve plate.

4. The centralized treatment device for kitchen waste of claim 2, wherein guide wheels are rotatably provided on upper and lower ends of a left side surface of the long partition, and a guide wheel is also rotatably provided on a left side surface of the first short partition;
    the first transmission rope is wound sequentially around the guide wheels on the upper and lower ends of the left side surface of the long partition, a bottom end of the first transmission rope is fixedly connected with a left end of the hanging basket, and a right end of the hanging basket is hinged to the reservoir area;

the second transmission rope is wound around the guide wheel on the left side surface of the first short partition, a left end of the second transmission rope is fixedly connected with a left end of the inner cover, and a right end of the inner cover is hinged to the first short partition; and the transmission rod passes through the gas treatment area.

5. The centralized treatment device for kitchen waste of claim 2, wherein a feed tube is provided in the gas treatment area, a bottom end of the feed tube is connected with the material box, the fan blade and the discharge outlet are located at two ends of the material box, the discharge outlet is located at a bottom end of the material box, a baffle plate is provided on a side of the discharge outlet close to the fan blade, and a height of the baffle plate is lower than a height of an inner wall of the material box.

6. The centralized treatment device for kitchen waste of claim 1, wherein the electrolysis device includes a first electrolysis electrode plate, a soft rope filler, and a second electrolysis electrode plate, the first electrolysis electrode plate and the second electrolysis electrode plate are both disposed in the degradation area, and the soft rope filler is disposed between the first electrolysis electrode plate and the second electrolysis electrode plate.

7. The centralized treatment device for kitchen waste of claim 6, wherein a downwardly extending vertical plate is fixed at a top end of the degradation area, a horizontal plate is fixed on a right side surface of the vertical plate, and a plurality of of filter holes are disposed in both the vertical plate and the horizontal plate;

a filtration area is formed between the right side surface of the vertical plate, an upper surface of the horizontal plate, and an inner wall of the box, a water drain outlet is provided at a bottom end of the filtration area, and a water drain valve is provided at the water drain outlet; and top ends of the first electrolysis electrode plate, the soft rope filler, and the second electrolysis electrode plate are fixed to a lower surface of the horizontal plate.

8. The centralized treatment device for kitchen waste of claim 7, wherein a vertical partition, a horizontal partition, and an inclined partition are fixed in the lower box, and a bottom end of the vertical partition, a right end of the horizontal partition, and a top end of the inclined partition are fixedly connected with each other;

the reservoir area is formed between a left side surface of the vertical partition, an upper surface of the horizontal partition, and an inner wall of the lower box;

the degradation area is formed between a right side surface of the vertical partition, a right side surface of the inclined partition and the inner wall of the lower box;

the separation area is formed between a lower surface of the horizontal partition, a left side surface of the inclined partition, and the inner wall of the lower box;

a first gap is provided between a top end of the vertical partition and a top end of the lower box, and a top end of the reservoir area is connected with a top end of the degradation area through the first gap; and the inclined partition is inclined downwards from left to right, a second gap is provided between a bottom end of the inclined partition and a bottom end of the lower box, the bottom end of the separation area is connected with the bottom end of the degradation area through the second gap.

9. The centralized treatment device for kitchen waste of claim 8, wherein a liquid drain outlet is provided at the bottom end of the reservoir area, a liquid drain valve is provided at the liquid drain outlet, an oil drain tube is connected at a top end of the separation area, an oil drain valve is mounted at a top end of the oil drain tube, and heights of the oil drain valve and the water drain valve are the same.

10. The centralized treatment device for kitchen waste of claim 8, further comprising a driving device configured to drive the outer cover to open or close.

* * * * *